(12) United States Patent
Yoon

(10) Patent No.: US 6,272,387 B1
(45) Date of Patent: Aug. 7, 2001

(54) WIRE HARNESS SYSTEM

(75) Inventor: Soo Yoon, Oreland, PA (US)

(73) Assignee: The Boeing Company, St. Louis, MO (US)

(*) Notice: Subject to any disclaimer, the term of this patent is extended or adjusted under 35 U.S.C. 154(b) by 0 days.

(21) Appl. No.: 09/187,853

(22) Filed: Nov. 6, 1998

(51) Int. Cl.[7] .................................................. G05B 15/00
(52) U.S. Cl. ............................ 700/83; 345/356; 700/17
(58) Field of Search .............................. 700/95, 13, 112, 700/103, 707, 83, 182.17, 184.15; 345/332, 427, 356, 357, 340, 341, 349; 29/867, 739; 702/108; 361/681

(56) References Cited

U.S. PATENT DOCUMENTS

| 3,736,652 | 6/1973 | Fletcher, Jr. ............................ 29/429 |
| 3,842,496 | 10/1974 | Mercer ................................... 29/867 |
| 4,043,017 | * 8/1977 | Folk et al. ............................. 29/749 |
| 4,218,745 | * 8/1980 | Perkins .................................. 29/739 |
| 4,677,734 | 7/1987 | Bloch et al. ......................... 29/564.9 |
| 4,701,007 | 10/1987 | Jonca ..................................... 385/147 |
| 4,947,546 | 8/1990 | Bowling et al. ....................... 29/261 |
| 4,979,544 | 12/1990 | Swindlehurst ...................... 140/92.1 |
| 5,153,839 | * 10/1992 | Cross .................................... 700/112 |
| 5,155,836 | * 10/1992 | Jordan et al. ....................... 395/500 |
| 5,179,775 | 1/1993 | Bogotzek et al. .................. 29/864.4 |
| 5,263,134 | * 11/1993 | Paal et al. ............................. 345/340 |
| 5,289,567 | * 2/1994 | Roth ..................................... 345/356 |
| 5,325,852 | 7/1994 | Glaser et al. .......................... 29/840 |
| 5,371,851 | * 12/1994 | Pieper et al. ......................... 702/108 |
| 5,757,647 | 5/1998 | DeMichele ............................ 700/95 |
| 6,075,531 | * 6/2000 | DeStefano ............................ 345/340 |

* cited by examiner

Primary Examiner—William Grant
Assistant Examiner—Kidest Bahta
(74) Attorney, Agent, or Firm—Lawrence G. Kurland, Esq.; Bryan Cave LLP

(57) ABSTRACT

The present invention provides a Wire Harness System method. This method is for aiding in the manufacture, repair, and testing of wire harnesses, wherein the method is run on a computer processor. The method further operates in a data acquisition mode and a display mode.

12 Claims, 8 Drawing Sheets

WIRE HARNESS SYSTEM

FIELD OF THE INVENTION

The present invention relates to graphical data systems. More particularly, the present invention relates to a system to aid in the manufacture, design, testing, and repairing of wiring harnesses.

BACKGROUND OF THE INVENTION

Often, many modem, large scale manufacturing projects require the interconnection of many different components and subassemblies. However, in order to fully take advantage of mass assembly, the manufacture, routing, and testing of such interconnections demands standardized routing, facile testing capabilities, and quick and accurate information pertaining to the interconnections. Such interconnections may range from standard electrical wire connections to fiber optic connections. However, regardless of the physical characteristics of the medium, the above requirements remain. Thus, the present invention provides a software system which aids in the manufacture, design, and testing of wiring harnesses, by first acquiring the requisite data from a Computer Aided Design/Computer Aided manufacturing (CAD/CAM) system, and by further displaying the referenced information graphically in a form that facilitates these activities.

An electrical wiring harness typically comprises a bundle of individual wires of varying gauges, impedances, and types, all arranged in a particular order. These wiring harnesses are typically bound together in order to facilitate the installation, repair and maintenance of the wires, and the connection of multiple remote systems. Such wiring harnesses are used in a variety of industries. In the aircraft industry, for example, wiring harnesses are used to interconnect the various electrical components and subassemblies of the multitude of systems located within an aircraft. However, they may also be used in virtually any industry where there is a need to interconnect a plurality of electrical components. For example, the automobile industry also uses such wiring harnesses.

A typical wire harness utilized in aircraft manufacture has an average of eight connectors per harness. Further, each wiring harness typically has at least one segment end containing wires to which electrical splices have been made or to which lug-type contacts have been applied. Typically, an average of five different wires types and gauges are used in a harness. Moreover, an average of one hundred wires per harness and twenty-eight wires per segment end are commonplace. Additionally, the harness may contain twisted pairs of wires, which in turn may have very large gauges, ranging from 0.047 inch to 0.084 inch.

In order to manufacture a typical wiring harness as detailed above, a large percentage of the work is accomplished manually. An individual wire is first coded with an identifying mark, and then cut to a predetermined length. Subsequently, the segments which will form a single wire harness are sent to a fabricating station where they are manually laid down on formboards. A formboard is typically a large, rigid framed area, usually made of plywood. The wire harness to be manufactured is then laid out and arranged on the formboard. Forming pegs are inserted into holes drilled in the formboard at appropriate locations to facilitate the routing of wires of any individual segment. In order to route wires on a formboard the connector from a first segment is placed at the appropriate location on the formboard. To accomplish this, a technician typically first searches for a prepared wire from a pile of wires, and then searches for a wire number in a data sheet. The wire number corresponds to the identifying mark that was imprinted on the wire while it was being prepared. The data sheet is commonly referred to as a "shop aid". Since a wire bundle can contain thousands of individual wires, the shop aid may consist of a multitude of pages corresponding to the various pieces of data associated with each of the individual wires. Merely locating the entry for a wire in the shop aid is time consuming and thus costly. Additionally, each time that the shop aid and wire harness maps are referenced, a potential for error is introduced. For example, a wire characteristic may be incorrectly read from the shop aid. Similarly, an incorrect wire location may be read from the wire map. This may occur often, since the shop aids are typically large books written in small font type. Accordingly, when a technician looks up a wire code in the shop aid, it is possible that incorrect data will be recorded. Moreover, once the wire number is found in the shop aid, the data provided typically only includes end equipment information (usually connectors and pin numbers) for the wire route. Therefore, the technician must still locate the equipment to be connected on a full scale wiring drawing and determine the path of each individual wire that is to be routed.

After the wire harness has been constructed on the formboard, it is then typically transferred to another fabrication station. At this station, the segments are stripped and the pin-type contacts are applied. Thereafter, the pin-type contacts in each segment must again be inserted into appropriate sockets in a multiple plug-type connector. To accomplish this, another technician must again locate the individual wire in a segment end, and identify it by the identifying mark imprinted on the wire. Again, the technician must then look up this code in the shop aid, and insert the appropriate pin-type contact on the individual wire into the appropriate socket in the connector. Once again, referencing the cumbersome shop aid is a tedious, error prone, and time consuming task.

Subsequently, the harness is installed on a subassembly and placed on a testing machine where the harness is tested for correct wire placement, continuity, and other various electrical tests. If a wire harness fails a specific test, the harness must be repaired. Once again, depending on what type of error is encountered, this process may well include referencing the shop aid for specific wire characteristics.

Similar problems are encountered when maintaining a wire harness after it has been installed. For example, in an aircraft, a technician servicing a wire harness will need to know the various characteristics of the individual wires, where they are connected, etc. This will again entail referencing the shop aid. Moreover, in this situation, the technician will most likely be working in an enclosed, cramped area, where use of the bulky shop aid is not at all practical.

Another disadvantage encountered when using the shop aid occurs when the wiring harness, or individual wiring data within the wire harness must be updated or revised. Under the above described scheme, a significant amount of time and effort is expended in updating, re-planning, and redistributing revised shop aid packages.

SUMMARY OF THE INVENTION

The present invention provides a Wire Harness System method. This method is for aiding in the manufacture, repair, and testing of wire harnesses, wherein the method is run on a computer processor. The method further operates in a data acquisition mode and a display mode, wherein the data acquisition mode comprises the following:

interfacing with a CAD/CAM system, and reading a data file from the CAD/CAM system, wherein the data file comprises at least a first indicator and a first data variable associated with the first indicator;

organizing the first indicator and the first data variable into an output file, wherein the first data variable is associated with the first indicator in the output file, and;

storing the output file on a storage means.

The display mode comprises the following steps:

receiving a request for a first indicator;

locating the indicator in the output file, and reading at least the first data variable associated with the first indicator;

creating an information bar, the information bar comprising at least the first indicator and the first data variable;

displaying the information bar;

creating an information window;

displaying the information window, the information window comprising at least the first indicator and the first data variable;

creating a global map and a local map;

displaying the global map and the local map;

locating a graphic associated with the indicator on the global map and the local map, and;

highlighting the located graphic in a color that differs from the background color of the global map and the local map.

BRIEF DESCRIPTION OF THE DRAWINGS

A better understanding of the present invention can be derived by reading the ensuing specification in conjunction with the accompanying drawings wherein.

DESCRIPTION OF THE PREFFERED EMBODIMENTS

Figure 1:
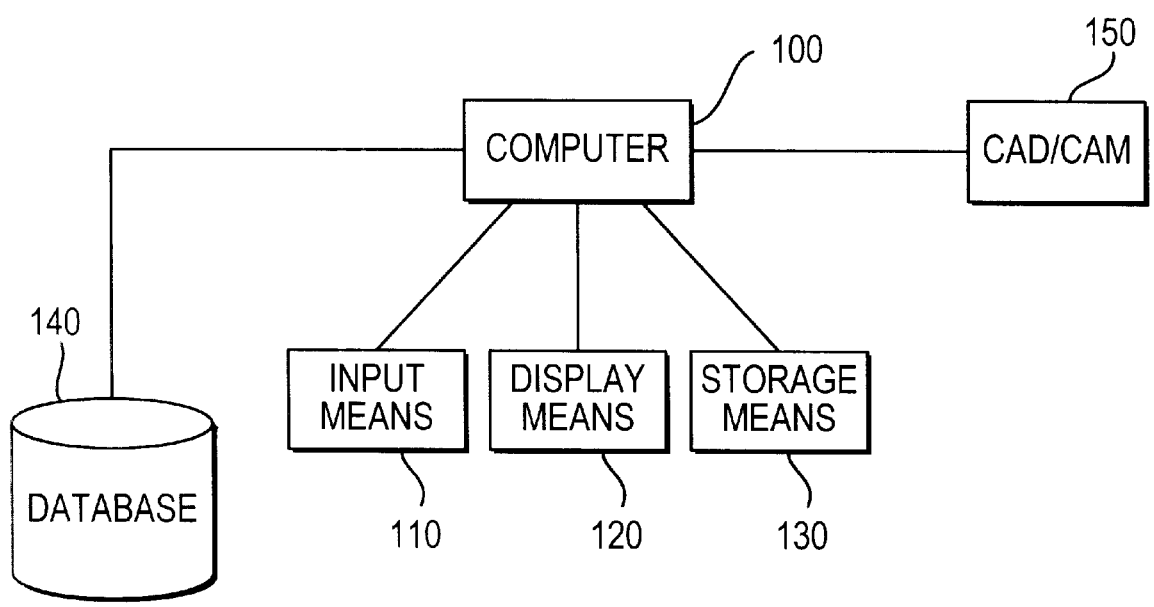
FIG. 1 is a general schematic of the present invention.

FIG. 1 shows generally the Wire Harness System of the present invention. Referring to FIG. 1, a computer 100 with an input means 110, a display means 120, and a storage means 130 is shown. The computer means 100 may be any type of suitable machine. For example, the computer means may be any machine capable of running the UNIX operating system. Similarly, the computer means may also be a centrally located computer, multi-user computer connected to a network, or a personal desktop computer, such as one running an Intel Pentium processor. The Wire Harness System of the present invention is stored on the storage means 130 while the computer means 100 is running the software, and may be of any suitable storage type, such as a magnetic or optical storage medium, or volatile storage, such as a ROM or RAM device. The display means may be any suitable display type, such as a color computer monitor. Similarly, as discussed below, the display means 120 may be a remote terminal, or a hand held, portable device. The input means 110 may be any type which is capable of receiving alphanumerical data. For example, in one embodiment of the present invention, the input means 110 may be a standard computer keyboard. In another embodiment of the present invention, the input means 110 may be any type of scanner that is capable of scanning a code from an individual wire.

Figure 4:
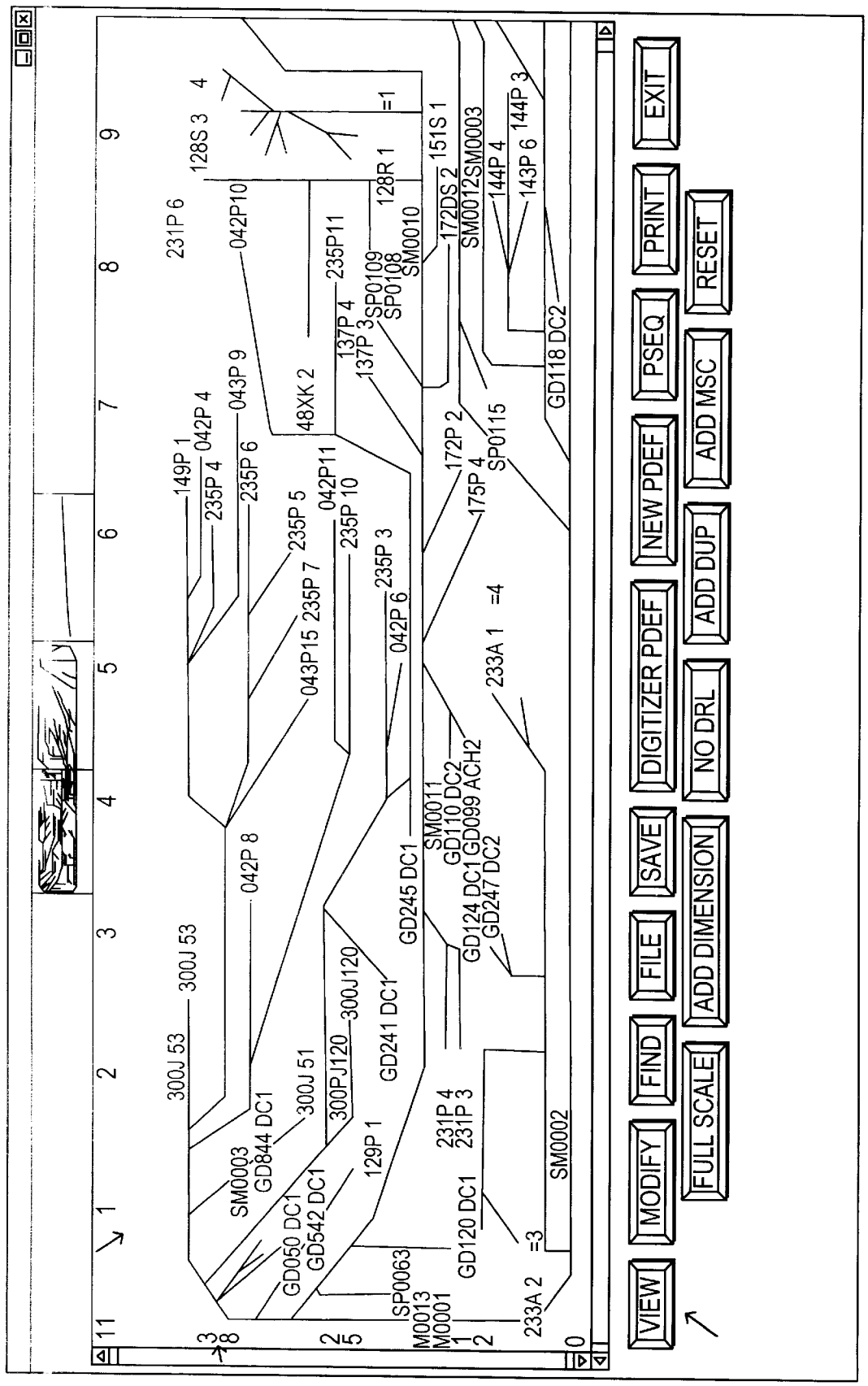
FIG. 4 is a first screen shot of a generated GUI of the present invention.

The code that defines the Wire Harness System comprises two parts; a data acquisition part, and a data display part. Generally, the data acquisition part is responsible for creating the data files used by the data display part, and for servicing data requests input by a user. The data display part is responsible for creating a graphical user interface (GUI), which displays the data retrieved by the data acquisition part. FIG. 4 shows a general screen shot of the a GUI generated by the data display part. The operation of both parts is described in detail below.

Preferably, the data acquisition part of the Wire Harness System is written in a high level language that is very portable. The Wire Harness System is run on the processor of the computer means 100, while the program code is stored on the storage means 130. In an embodiment of the present invention, the data acquisition part is written in ANSI C, and compiled for use on a computer running the UNIX operating system. Any suitable compiler that is ANSI C compatible may be used. For example, an ANSI or GUI compiler may be used. The use of C allows the data acquisition part to be highly portable, and easily upgraded and maintained. Thus, the Wire Harness System may also be compiled for virtually any computer, such as one implementing an Intel Pentium processor, merely by using a different compiler.

In order to implement the GUI, any programming language capable of manipulating graphics is suitable. In a preferred embodiment of the present invention, the data display part is written in Tool Command Language/Tool Kit (TCL/TK). The use of TCL/TK allows the data display part to be ported to a wide variety of machines. However, many other programming languages, such as C or Java, are equally acceptable.

The Wire Harness System of the present invention operates in two modes. In a first mode, the Wire Harness System receives information and calculates and stores the required data for each individual wire and connector of the wire harness. In this mode, the Wire Harness System also generates a wire map of the complete harness. In a second mode, the Wire Harness System accesses the compiled data from a suitable storage means and displays the queried data on the display means. The following will detail the operation of the Wire Harness System in each of these modes.

Mode I: Acquisition and Calculation of Wire Data

Figure 2:
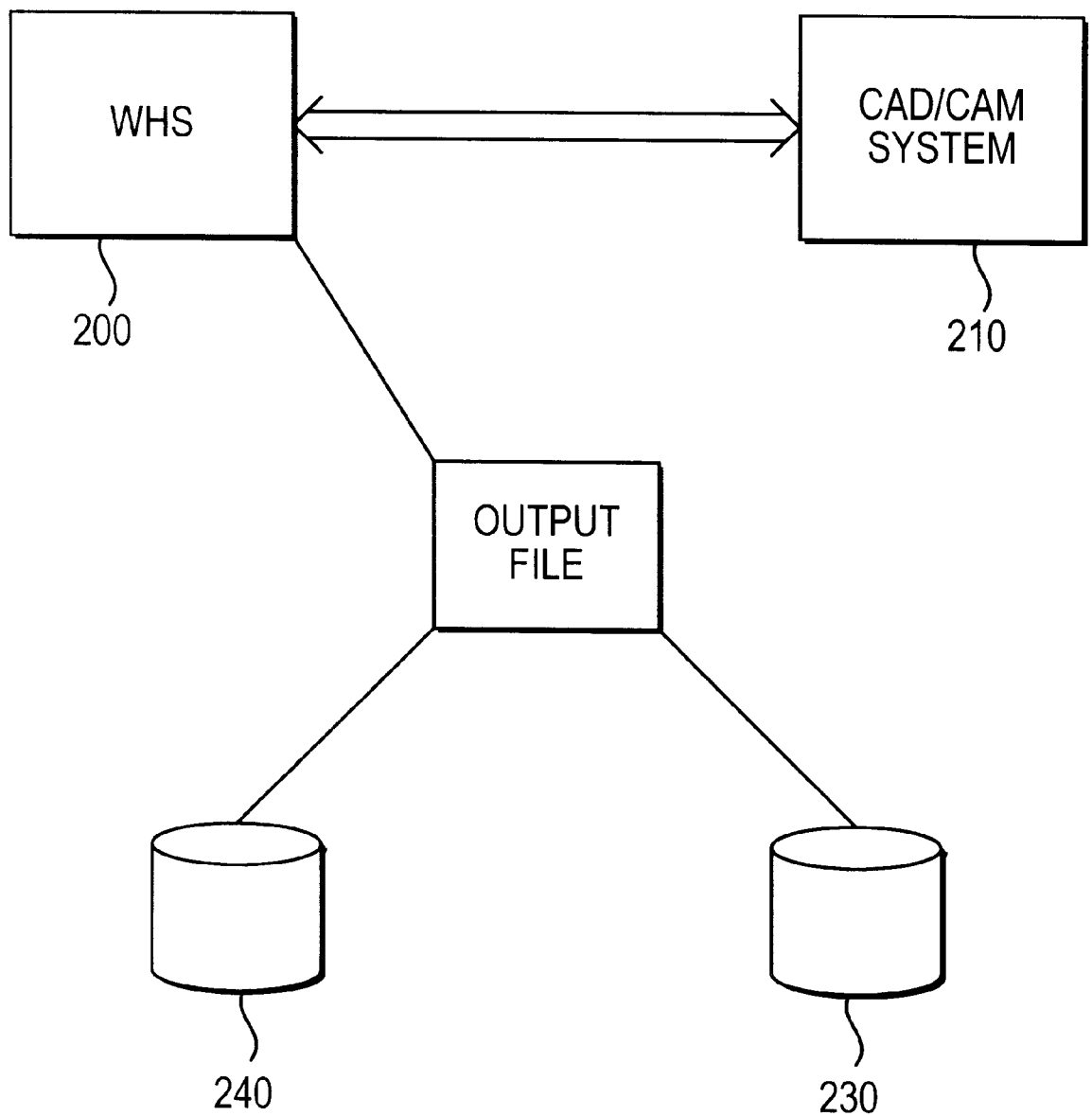
FIG. 2 is a schematic of the present invention when operating in a first mode.

When operating in this mode, the Wire Harness System calculates and organizes the data that will be later retrieved and displayed by the data display part, for use in repairing, testing, and maintaining the wiring harness. As shown in FIG. 2, this is accomplished by interfacing with a Computer Aided Design and Manufacture (CAD/CAM) system. This system may be any program that is capable of complex computer aided design. In a preferred embodiment, the CAD/CAM 210 of FIG. 2 is implemented using the commercially available CAD/CAM software entitled "CATIA". An example of another CAD/CAM package that may be use is "Unigraphics." Although CAD/CAM software packages are well known in the prior art, a brief review of their functionality and implementation would enable a better understanding of the present invention. A CAD/CAM program is a general-purpose computer aided drafting application program designed for use on a variety of computers and graphic workstations. It is an interactive drawing system designed to permit a user to construct or edit a drawing on a graphics display screen. CAD/CAM programs are generally capable of modeling three dimensional systems. CAD/CAM programs, however, differ from simple graphics programs in how they interact with the entered model. Simply put, each part of a modeled system may be treated as an object rather than locations on a screen. For example, in a typical graphics program, a line is little more than a collection of pixels on the screen. In a CAD/CAM program, however, a line is represented by its two endpoints. Similarly, a circle is represented by its center point and radius. Further, typical CAD/CAM programs allow other pieces of data to be associated with a particular object in a model.

Figure 3:
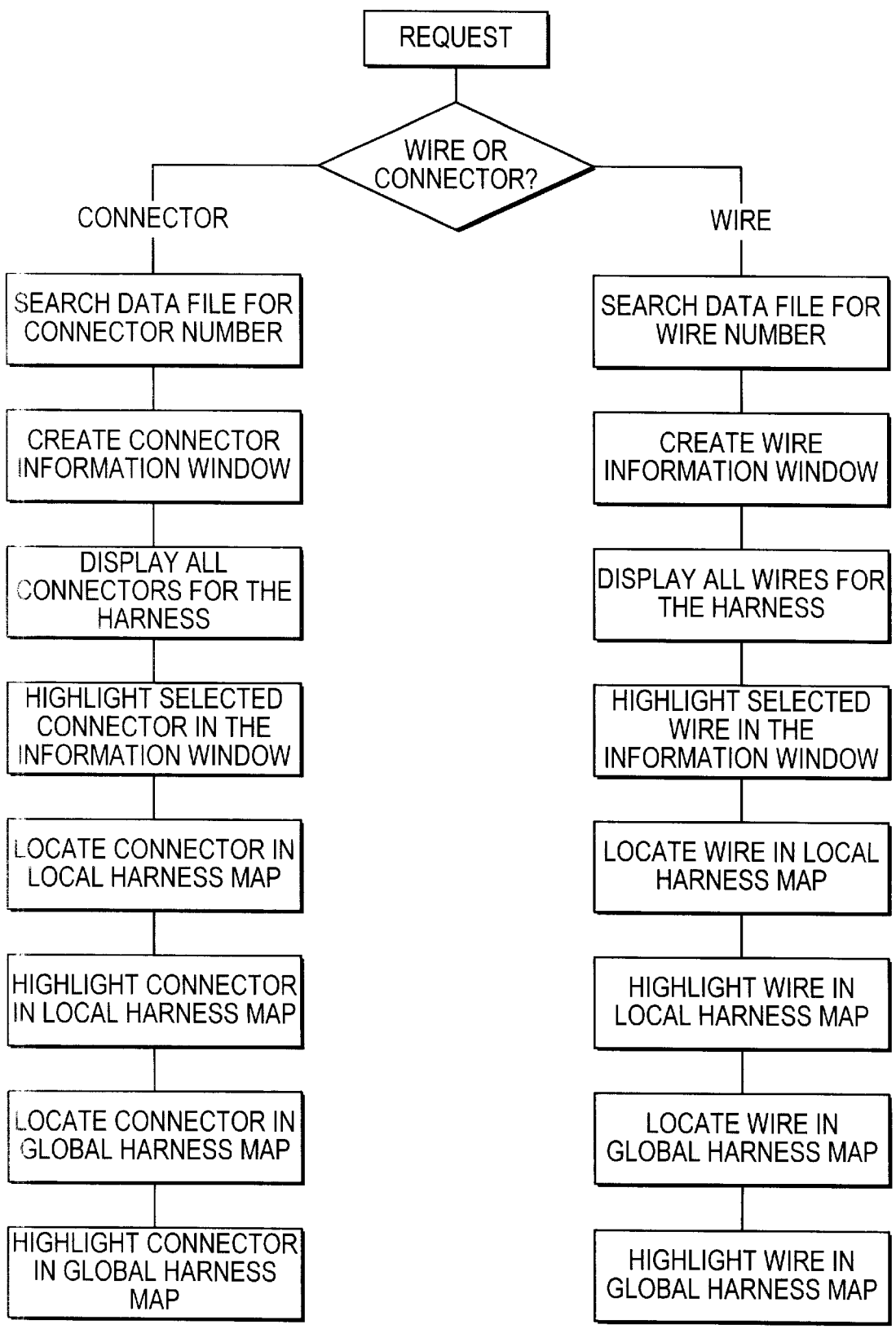
FIG. 3 is a flow diagram of the operation of the present invention.

Thus, as shown in the flow chart of FIG. 3, once a wire harness has been modeled in a CAD/CAM program, the data is read by the Wire Harness System. Depending on how the wire harness is modeled in the CAD/CAM software, the Wire Harness System may also calculate certain data (such as calculating wire length from the endpoints of the wire) from data stored in the model. Subsequently, the Wire Harness System outputs this information into a file. The file contains either a wire code or connector code, and all other data associated with either the wire or the connector. This file may be organized into any structure that associates the wire or connector code with its corresponding data. For example, the file may be a simple comma delimited file, with each wire or connector separated by a line break. However, any convenient file structure is also acceptable. Referring to FIG. 2, the file can then be stored in a storage means 240, or it can be further exported into a relational database 230. The storage means 240 may be a ROM, magnetic or optical media, or any other type of storage media. By storing the data in a relational database, the search time for large volumes of data is reduced. Further, it is simpler to store the relational database in a central location, allowing easier access for multiple users. An example of a relational database that may be used is the commercially available relational database entitled "Oracle". Other commercially available packages, such as SQL, are also acceptable.

By importing the data from a CAD/CAM program, the Wire Harness System affords several advantages. As discussed below, it organizes the data in a format that can be easily retrieved and manipulated such that it is presented in an easy to read format. Further, organizing the information in this fashion allows updating of the information for a particular wire harness to be accomplished with ease. Rather than print out individual data specifications for each harness for each technician, the Wire Harness System can simply update the database from the revised CAD/CAM drawings. This in turn ensures that when a technician requests data from the Wire Harness System, as described below, the most recent information is displayed.

Mode 2: Testing and Repair

Figure 5:
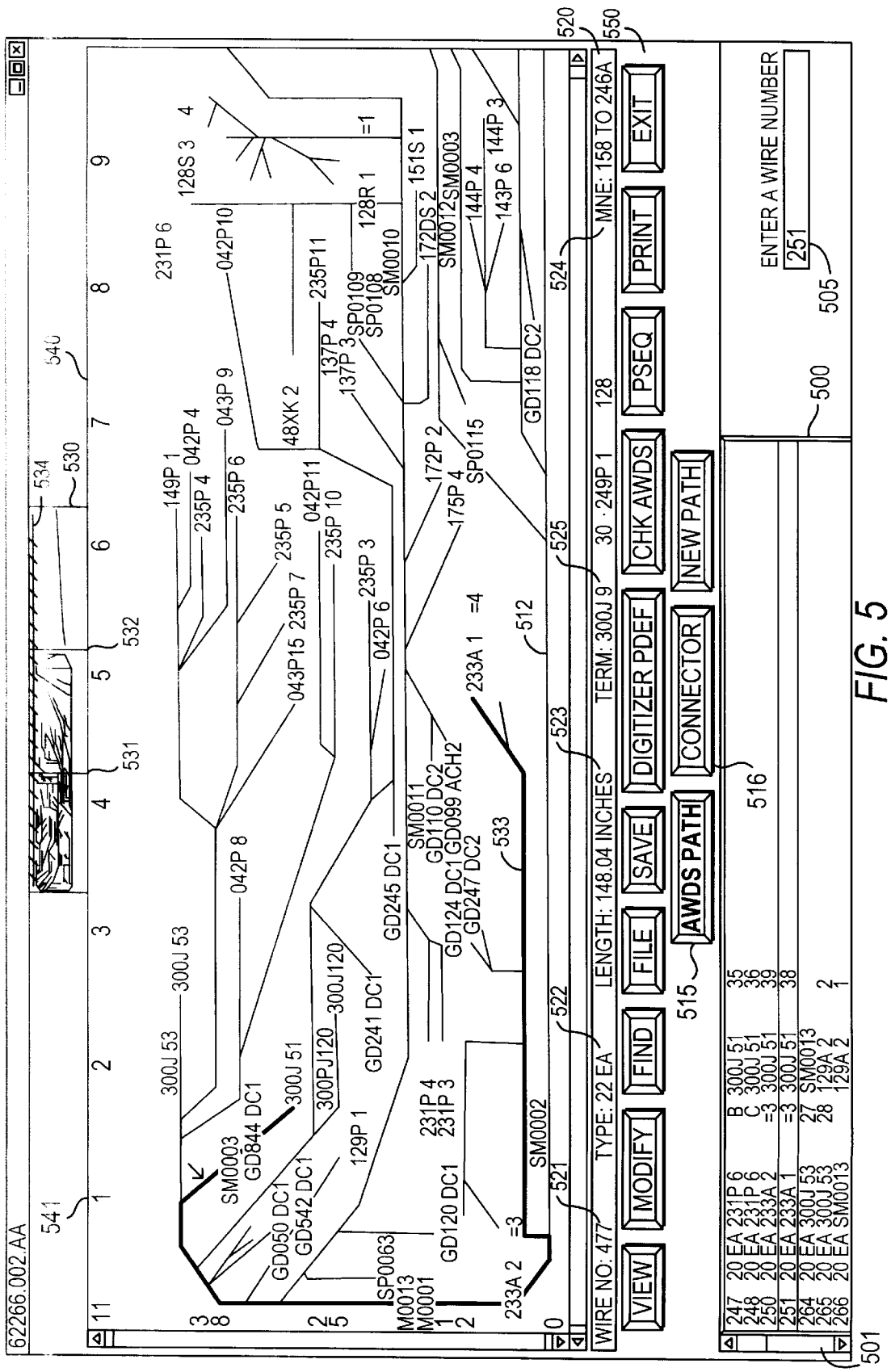
FIG. 5 is a second screen shot of a generated GUI of the present invention.
Figure 6:
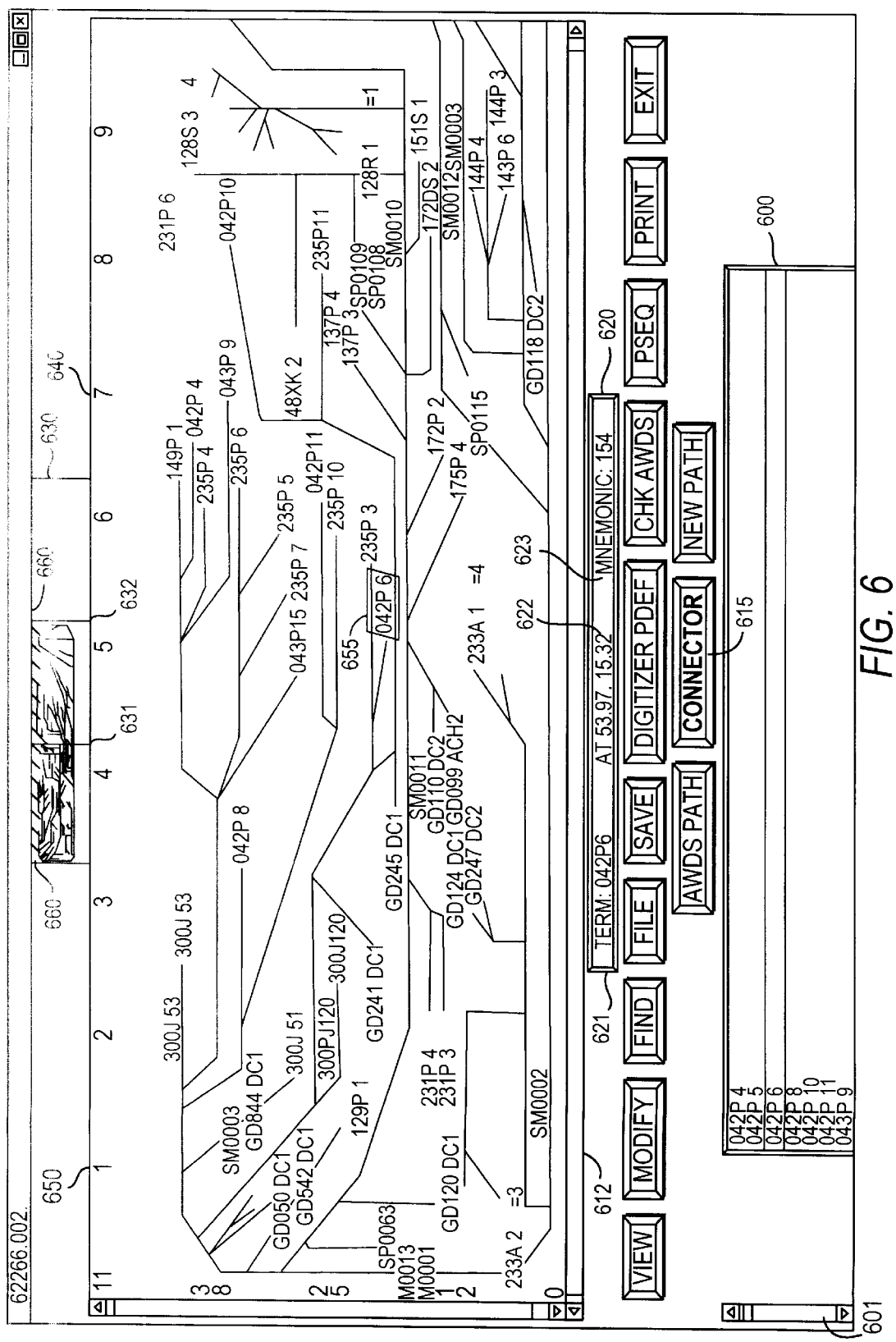
FIG. 6 is a third screen shot of a generated GUI of the present invention.

As discussed above, the GUI generated by the data display part organizes data in a manner such that a technician testing or repairing a wire harness will be able to do so easily, quickly, and accurately. The manner in which the data is presented depends upon the type of data requested. The technician may request two types of data; data pertaining to an individual wire, or data pertaining to an individual connector. In each case, the technician will either enter a request for a wire code, or a connector code. The technician informs the Wire Harness System what type of data he is entering by "pressing" an appropriate button. For example, as shown in FIG. 5, by selecting the "AWDS Path" button 515, the Wire Harness System will search for a wire code. Similarly, as shown in FIG. 6, if the "Connector" button 615 is selected, the Wire Harness System will search for a connector code.

As shown is shown generally in the flow chart of FIG. 3, the Wire Harness System will collect the data according to the entered request. Upon receiving the request for data entered in data request window 505 of FIG. 5, the Wire Harness System will determine whether the request was for wire data, or for connector data. In this case, the "AWDS Path" button is selected. Thus, the Data Acquisition part will search a data file for the wire code entered. This search may be implemented in a variety of ways, depending on the type of data that is being manipulated. It may be advantageous, for example, to use flat files and allow the Wire Harness System to conduct its own search of the file. However, when manipulating large amounts of data, it may be advantageous to abstract the data below a relational database. In this case, the Wire Harness System would issue a query to the database based on the entered request, and then receive the data once the request has been processed.

Referring again to FIG. 5, the data display part organizes the GUI depending on the type of data requested. In this case, since individual wire information has been requested, the data display part organizes the GUI in a manner that allows the most efficient access to this information. As shown in FIG. 5, the screen is organized into five main areas; the global harness map 530, the local harness map 540, the information bar 520, the user options menu 550, and the data information windows 500.

Upon receiving the requested data, the data acquisition part retrieves the requested data, and the data display part generates the aforementioned GUI. As shown in FIG. 5, the data information window 500 is generated such that all the wires in the harness are displayed, while the requested wire's data is displayed in an easy to read format. As shown, the requested wire is highlighted in a color different from the background color of the data information window 500. This also grants the technician the ability to browse other wire information by scrolling the scroll bar 501.

Further, the data display part generates the information bar 520 as shown in FIG. 5, the information bar displays the wire number 521, the wire type 522, the wire length 523, the form board location of the wire 524, and the originating/terminating pin number 525. As discussed above, when reading an individual wire's characteristics from a large list, it is easy for a technician to read the wrong information. By displaying the information in this manner, the Wire Harness System reduces greatly the probability of this type of error from occurring.

However, once the correct wire data has been read, the technician must now locate the particular wire in the wiring harness. Typical wire maps are large, cumbersome, and difficult to work with. In order to facilitate the location of the wire so that the technician may complete the required task, the data display part also generates global harness map 530 and local harness map 540. The global harness map 530 displays the entire wire map of the harness that the technician is currently working on. The local harness map 540 displays a portion of the global harness map, allowing for greater detail to be displayed. The portion of the global harness map 530 that the local harness map 540 is displaying is indicated by indicator bars 531 and 532. By "clicking" on a desired global map 530, the local map 540 will zoom on the corresponding portion. Further, in order to maintain consistency between the physical formboard and the displayed local and global maps, both the local harness map 540 and the global harness map 530 are bounded by scale indicators 541 and 534. These indicators use the same units measured on the actual formboard. By way of example, the scale indicators 541 and 534 depict inches. After the Wire Harness System receives the requested data, it locates the corresponding wire on both the global harness map 530 and the local harness map 540. The data display part then highlights the wire that corresponds to the technician's query. As shown in FIG. 3, wire 533 is highlighted in both the local map 540 and the global map 530, while the data corresponding to the wire is displayed in both the information bar 520 and the information window 500. Moreover, if the entire wire is not displayed in the local wire map 540, scroll bars 511 and 512 allows the technician to scroll the local map 540 to easily follow the wire through the harness. Similarly, as the technician scrolls through the local wire map 540 with scroll bars 511 and 512, indicators 531 and 532 similarly move to indicate the portion of the harness that is being viewed in the local wire map 540.

As discussed above, the data display part can also organize the GUI based on a requested connector data rather than a requested wire. Referring now to FIG. 6, after accepting a request and upon receiving the requested data from the data acquisition part, the data display part generates the connector GUI. The information window 600 is generated such that all the connectors in the harness are displayed while the requested connector's data is displayed in an easy to read format. As shown, the requested connector is highlighted in a color different from the background color of the information window.

Further, the data display part generates the information bar 620. As shown in FIG. 6, the information bar displays the terminal number 621, the connector's x and y location 622, and the formboard location 623.

As above, in order to facilitate the location of the connector, the data display part also generates global harness map 630 and local harness map 640. The global harness map 630 displays the entire wire map of the harness that the technician is currently working on. The local harness map 640 displays a portion of the global harness map, allowing for greater detail to be displayed. The portion of the global harness map 630 that the local harness map 640 is displaying is indicated by indicator bars 631 and 632. As detailed above, the local map 640 will zoom on a section that is "clicked" on the global map 630. Similarly, as also detailed above, scale indications 650 and 660 are in units that are consistent with the scale as depicted on the physical formboard. After the Wire Harness System receives the requested data, it locates the corresponding connector on both the global harness map 630 and the local harness map 640. The data display part then highlights the connector that corresponds to the technician's query. As shown in FIG. 6, connector 655 is highlighted in both the local map, and its general location is highlighted in the global map, while the data corresponding to the connector is displayed in both the information bar 620 and the information window 600.

As discussed above section, the local map 640 also is bounded by vertical scroll bar 611 and horizontal scroll bar 612. Similarly, the information window 600 is bounded on the left by vertical scroll bar 601. Scrolling in the connector GUI is accomplished as detailed above in the description of the wire GUI.

Figure 7:
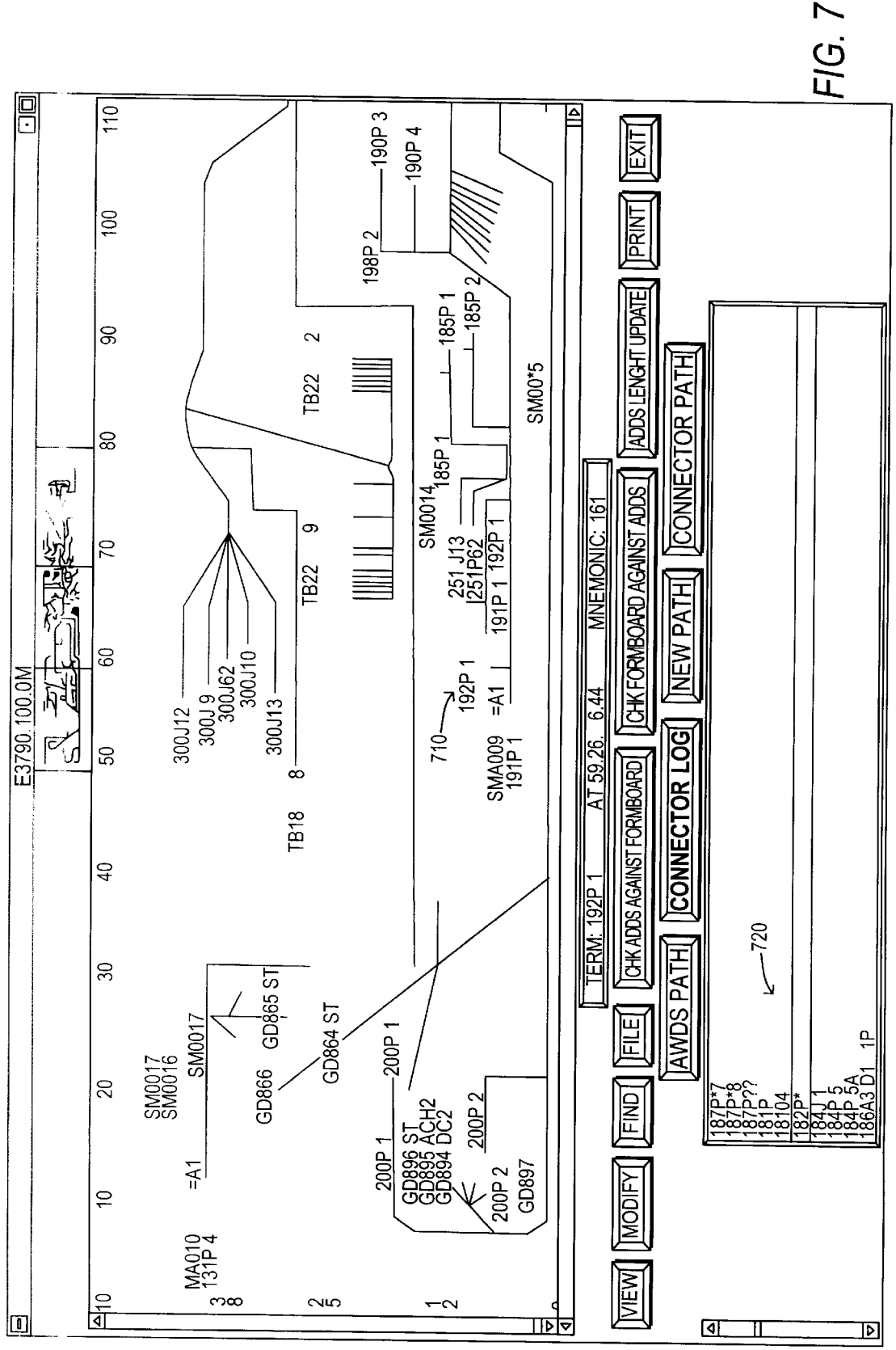
FIG. 7 is a fourth screen shot of a generated GUI of the present invention.

As shown in FIG. 7, the Wiring Harness System is also capable of displaying all wires connected to a specific connector. By clicking on any connector, the information window 700 will display all wires connected to that connector. For example, by clicking on connector 710, the information window 700 will display the wires 720 connected to the connector 710.

Figure 8:
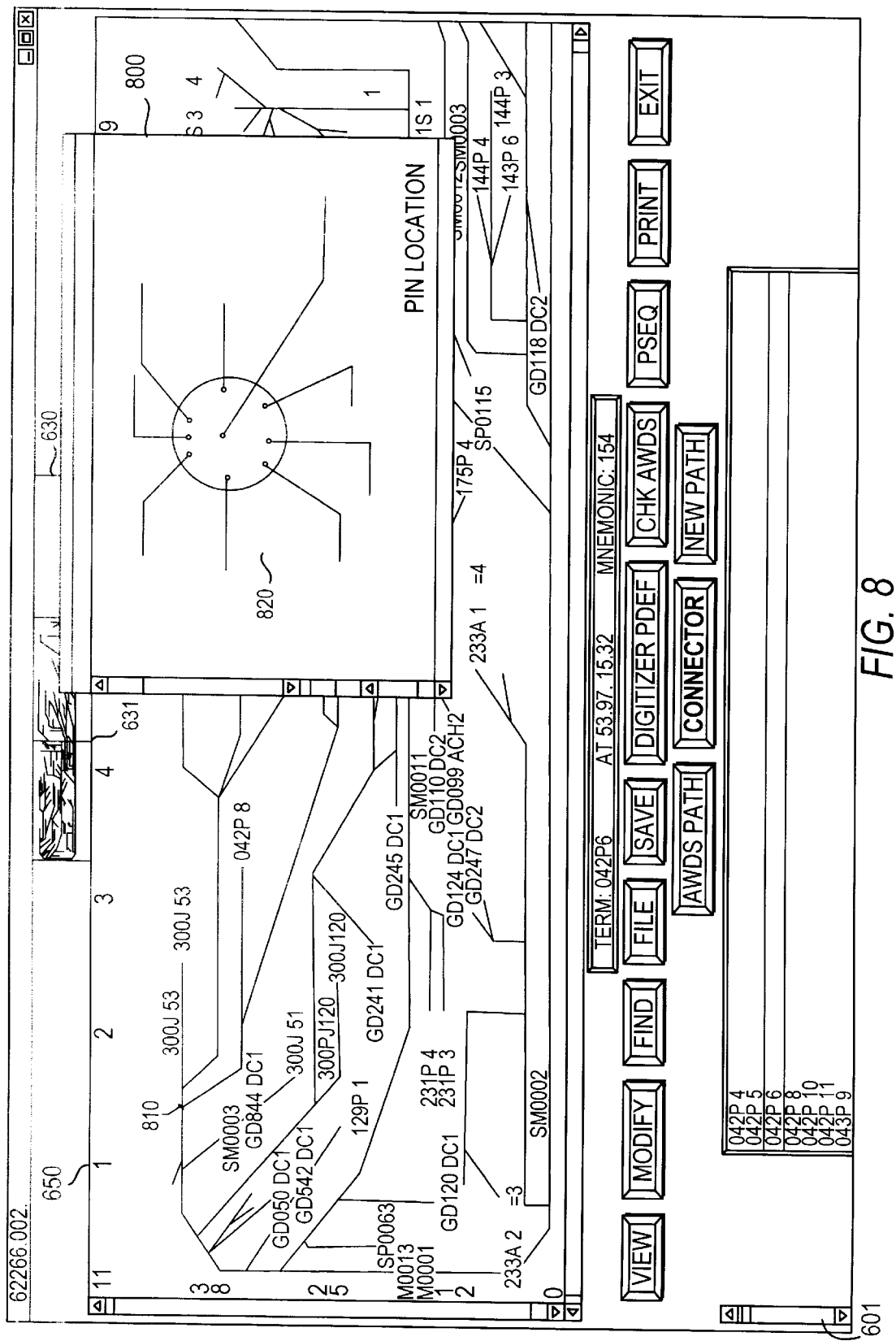
FIG. 8 is a fifth screen shot of a generated GUI of the present invention.

Lastly, as shown in FIG. 8, the data display part is also capable of displaying a map of a particular connector. By "clicking" on a desired connector to be viewed 810, the data display part will display window 800. This window 800 will depict the desired connector 820 in graphical form, with the pin locations shown.

These GUIs thus present the technician with the most efficient way to simultaneously and efficiently note the characteristics of the individual wire, how it is routed in the local portion of the harness that it being worked on, and to trace its path throughout the entire wire harness. Further, it will be appreciated by those skilled in the art that there can be departure from the specific embodiment of the invention described herein without departing from the true scope of the claims appended hereto.

What is claimed is:

1. A method for aiding in the manufacture, repair, and testing of wire harnesses, wherein said method is run on a computer processor, said processor interfacing with a CAD/CAM system, said method further operating in a data acquisition mode and a display mode, said data acquisition mode comprising:

reading a data file from said interfaced CAD/CAM system, wherein said data file comprises at least a first indicator and a first data variable associated with said first indicator;

organizing said first indicator and said first data variable into an output file, wherein said first data variable is associated with said first indicator in said output file, and;

storing said output file on a storage means;

said display mode comprising:

receiving a request for a first indicator;

locating said indicator in said output file, and reading at least said first data variable associated with said first indicator;

creating an information bar, said information bar comprising at least said first indicator and said first data variable;

displaying said information bar;

creating an information window;

displaying said information window, said information window comprising at least said first indicator and said first data variable;

creating a global map and a local map, said local map displaying a portion of said global map;

displaying said global map and said local map;

locating a graphic associated with said indicator on said global map and said local map, and;

highlighting said located graphic in a color that differs from the background color of said global map and said local map.

2. The method of claim 1, wherein said interfacing step comprises the step of interfacing said computer processor with a network.

3. The method of claim 1, wherein said computer processor is an independent, stand alone processor.

4. The method of claim 1, wherein said step of receiving a request for a first indicator comprises the step of receiving a data input from a computer.

5. The method of claim 1, wherein said step of receiving a request for a first indicator comprises the step of receiving a data input from a scanning means.

6. The method of claim 1, wherein said step of storing said output file comprises storing output file in a rational database format.

7. The method of claim 1, wherein said step of storing said output file comprises storing said output file is a common delimited format.

8. The method of claim 1, wherein said step of displaying said information bar comprises displaying a wire type associated with said fist indicator, a wire length associated with said first indicator, an originating pin number, a terminating pin number, and a formboard location number associated with said first indicator.

9. The method of claim 1, wherein said step of displaying said information window comprises displaying a first and second scroll bar; said first scroll bar scrolling displayed text within said information window vertically; said second scroll bar scrolling displayed text within said information window horizontally.

10. The method of claim 1, wherein said step of displaying said global map comprises displaying a first and second boundary indicator bar, wherein said first boundary indicator bar indicates the left boundary of said local map, said second boundary indicator bar indicates the right boundary of said local map.

11. The method of claim 1, wherein said step of displaying said local map comprises displaying a first and second scroll bar, said first scroll bar scrolling displayed information within the local map vertically; said second scroll bar scrolling displayed information within said local map horizontally.

12. The method of claim 1, wherein said display mode further comprises the step of receiving input from a user corresponding to a location on said global map, and repositioning said local map to correspond to said selected input.

* * * * *

UNITED STATES PATENT AND TRADEMARK OFFICE
CERTIFICATE OF CORRECTION

PATENT NO. : 6,272,387 B1  
DATED : August 7, 2001  
INVENTOR(S) : Soo Yoon

Page 1 of 1

It is certified that error appears in the above-identified patent and that said Letters Patent is hereby corrected as shown below:

<u>Title page,</u>  
Item [56], References Cited, U.S. PATENT DOCUMENTS, please change "5,325,852" to -- 5,325,582 --

Signed and Sealed this

Seventh Day of May, 2002

*Attest:*

*Attesting Officer*

JAMES E. ROGAN  
*Director of the United States Patent and Trademark Office*